July 5, 1949.  B. J. C. VAN DER HOEVEN  2,474,874
RECOVERY OF BYPRODUCT ETHER
Filed Nov. 9, 1945
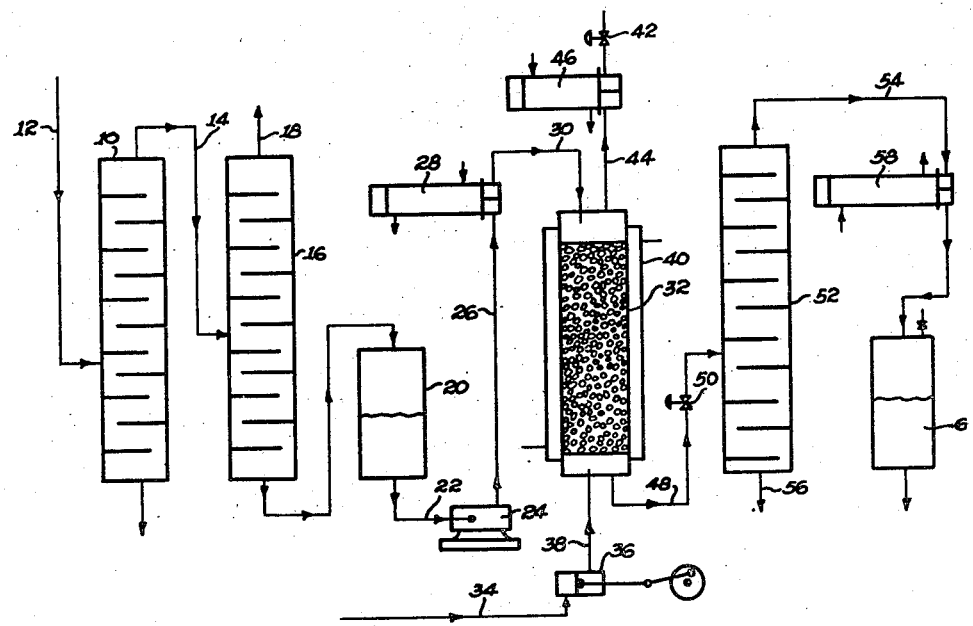
WITNESSES:
INVENTOR
BERNARD J.C. VAN DER HOEVEN.
BY
his ATTORNEY

UNITED STATES PATENT OFFICE 2,474,874

RECOVERY OF BY-PRODUCT ETHER

Bernard J. C. van der Hoeven, Windy Ghoul, Beaver, Pa., assignor to Koppers Company, Inc., Pittsburgh, Pa., a corporation of Delaware Application November 9, 1945, Serial No. 627,750

6 Claims. (Cl. 260—616)

This invention relates to the refining of contaminated ether. More particularly the invention relates to the recovery and refining of contaminated ether which is a byproduct of the catalytic process of making butadiene from ethyl alcohol.

In the catalytic conversion of ethyl alcohol to butadiene a substantial amount of ethyl ether is formed. At the same time acetaldehyde, ethyl acetate, ethyl alcohol, ethyl vinyl ether, olefins and diolefins including pentene-1, pentene-2, piperylene, and other materials are formed. In refining these butadiene by-products to recover ethyl ether by distillation it has been found that it is difficult to separate the ethyl ether from its associated olefinic and carbonylic contaminants. The ether obtained by distillation usually contains acetaldehyde, ethyl vinyl ether, and $C_5$ unsaturated hydrocarbons.

Ethyl ether provides an excellent raw material for the production of ethylene by its catalytic dehydration. Therefore, ethyl ether may replace two molecular equivalents of ethyl alcohol for the production of ethylene, which can be used, for example, in the production of styrene by the ethylation of benzene. On the other hand, ethyl ether may be catalytically hydrated with steam to produce ethyl alcohol which may be reused in the production of butadiene. It has been found, however, that the byproduct ether, which contains impurities such as acetaldehyde, ethyl vinyl ether, and $C_5$ unsaturated hydrocarbons, is not satisfactory for the catalytic dehydration to ethylene or the catalytic hydration to ethyl alcohol, because the impurities foul or poison the dehydration or hydration catalysts. Such fouling or poisoning of the catalyst is technically undesirable because it reduces, lowers, diminishes the degree of conversion and/or requires higher temperatures and lower feed rates to obtain the desired degree of conversion.

The primary object of the present invention is to provide a process of refining byproduct ether by which ethyl ether may be recovered that may be efficiently catalytically dehydrated or hydrated without detrimentally poisoning the catalysts.

Another object of the invention is to provide a process of refining byproduct ethers by which an ether well adapted for use as a stable solvent is produced.

While the impurities such as acetaldehyde and unsaturated hydrocarbons are detrimental in poisoning catalysts used for hydration or dehydration of ether, it has been found that the products formed by the hydrogenation of the aldehydes and unsaturated hydrocarbons such as ethyl alcohol and pentane are not harmful to these catalytic reactions. Thus, when ethyl ether, containing the aldehydes or contaminants and unsaturated hydrocarbons contaminators, is hydrogenated, it is not necessary to so carefully refine the ether to separate the hydrogenated contaminators to prepare the ether for the catalytic hydration and dehydration reactions.

A further object of the invention is to provide a process of refining ethyl ether by which the contaminators associated with the ethyl ether are converted to compounds which are not detrimental to the catalytic hydration or dehydration of the ether and do not need to be carefully separated from the ether before the hydration or dehydration reaction is carried out.

With these and other objects in view the invention consists in the improved process of refining byproduct ether, which is hereinafter described and particularly defined in the appended claims.

The various features of the invention are illustrated in the accompanying drawing which is a flow sheet showing an apparatus in which the preferred process of the invention may be carried out.

In the catalytic conversion of ethyl alcohol to butadiene a considerable amount of ethyl alcohol and acetaldehyde pass through the conversion zone without being converted. In addition to these materials ethyl ether, ethyl vinyl ether, $C_4$ and $C_5$ olefins and diolefins and ethyl acetate are formed in the process. The conversion products of the butadiene conversion process are distilled to separate a crude extract oil from the butadiene. The crude extract oil is introduced into a still 10 through a line 12 in which ethyl ether, acetaldehyde, some of the $C_5$ unsaturated hydrocarbons and ethyl vinyl ether pass overhead while most of the $C_5$ unsaturated hydrocarbons, ethyl acetate and other higher boiling materials are withdrawn from the bottom of the still. The overhead from the still 10 passes through a line 14 into the mid portion of a still 16. The major part of the acetaldehyde and a small amount of ethyl ether pass out of the top of still 16 through a line 18 while the ethyl ether, ethyl vinyl ether, some acetaldehyde, and some $C_5$ unsaturated hydrocarbons pass out the base of the still into a storage tank 20. This mixture is then drawn from the tank 20 through a line 22 and pumped under pressure by a pump 24 through a line 26 to heater 28. The preheated crude ether product passing through the heater 28 flows through a line 30 into the top of a jacketed converter 32 and flows downwardly through the converter. The material passing into the top of the converter is preferably held under sufficient pressure to maintain the ether in the liquid phase and hydrogen is drawn from storage through a line 34 and passed by means of a compressor 36 through a line 38 into the bottom of the converter 32. The converter 32 is a hydrogenation converter which is preferably filled with an activated granular Raney nickel or other well known hydrogenation catalyst. A jacket 40 is mounted on the outside of the catalyst chamber by which the temperature may be controlled and maintained in the desirable range for the hydrogenation reaction. Preferably a temperature of from 85 to 150° C. is maintained in the catalyst bed to carry on the hydrogenation of the products in the converter. With a temperature of from 85 to 150° C. a pressure of 100–200 lbs. will hold the ether mixture in a liquid phase to assist in obtaining a more efficient hydrogenation reaction. The maintenance of the ether in the liquid phase is desirable because if the temperature tends to rise beyond a predetermined temperature ether may be evaporated by manipulating a valve 42 and the heat of vaporization of the ether will lower the temperature in the catalyst zone, this heat being removed from system in condenser 46. Any ether vapor together with hydrogen which passes out of the top of the converter 32 through a line 44 passes through a condenser 46 to condense and save the ether. The hydrogen may be recycled through the process.

By the hydrogenation reaction the acetaldehyde is converted to ethyl alcohol, the ethyl vinyl ether is converted to diethyl ether and any $C_5$ unsaturated hydrocarbons are converted to saturated hydrocarbons. If the ethyl ether contains any of the higher aldehydes, such as crotonaldehyde and butyraldehyde, these products are converted to alcohols.

Under normal conditions the hydrogenation may be carried to the point where the deleterious aldehyde, ethyl vinyl ether and olefins may be removed when operating under a pressure of 100–200 lbs. A more efficient hydrogenation of the undesired products may, however, be carried out in the hydrogenation reaction if a pressure of 500 to 1000 lbs. is maintained within the converter. Under normal conditions, however, 100–200 lbs. pressure has been found satisfactory for purifying ether suitable for dehydration to ethylene and for hydration to ethanol.

Tests have been made wherein the contaminated ether may be hydrogenated in the vapor phase to separate the deleterious materials. In this reaction a temperature of approximately 150° C. is utilized at atmospheric pressure with a liquid hourly space velocity of 0.92. A vapor phase reaction may be carried out at a temperature of 100 to 125° C. with a liquid hourly space velocity of 30 when maintaining a hydrogenated pressure of 100 lbs. per square inch.

The hydrogenated product produced in the converter 32 leaves the bottom of the converter through a line 48 and passes through a pressure reducing valve 50 into the mid portion of a still 52. In the still 52 ethyl ether and some $C_5$ paraffin hydrocarbons may be taken overhead through a line 54 while the ethanol, butanol and other higher boiling materials are removed from the base of the still through a line 56. The overhead product passes through the line 54 into a condenser 58 and accumulates in a receiver 60. The material in the receiver 60 is suitable for dehydration of the ethyl ether to recover ethylene and for hydration of ethyl ether to produce ethanol, and for use as a stable solvent. The paraffin hydrocarbons present do not interfere with these applications. The distillation steps carried out in the stills 10 and 16 remove the major portion of the contaminates of the ethyl ether; therefore the contaminated ether, which has been treated in the hydrogenation converter 32 does not need to be so carefully fractionated to remove the conversion products such as alcohols and paraffin hydrocarbons.

The ethyl ether purified in accordance with the present invention may be effectively hydrated or dehydrated by treatment with a metallic oxide catalyst such as alumina, bauxite or silica. When the ether is hydrated catalytically steam is passed through the metallic oxide with the ether. When the ether is dehydrated, the ether vapor alone is passed into contact with the metallic oxide. The temperatures, pressures and space velocities for the hydration process differ from the temperatures, pressures and space velocities for the dehydration process.

The preferred form of the invention having been thus described, what is claimed as new is:

1. A process of refining ether comprising: distilling a byproduct oil containing products such as ethyl ether, ether alcohol, acetaldehyde, ethyl acetate, olefins, diolefins, and other impurities to separate a fraction containing principally ethyl ether, $C_5$ unsaturated hydrocarbons and aldehydes; passing the separated mixture through a nickel catalyst bed in contact with hydrogen at a temperature of 85° to 150° C. under pressure to effect a hydrogenation of impurities therein; and fractionally distilling the hydrogenated mixture to separate ether from the hydrogenated mixture.

2. The process defined in claim 1 in which the hydrogenation reaction is carried out at a pressure of approximately 100 lbs. per square inch.

3. The process defined in claim 1 in which the hydrogenation reaction is carried out in the liquid phase.

4. The process defined in claim 1 in which the hydrogenation process is carried out at a pressure above 500 lbs. per square inch.

5. The process defined in claim 1 in which the hydrogenation reaction is carried out in the vapor phase.

6. A process of purifying byproduct ether containing aldehydes, alcohols and olefins and other impurities of closely related boiling points comprising: separating by distillation ethyl ether, acetaldehyde and $C_5$ unsaturated hydrocarbons from the remaining impurities, hydrogenating any aldehydes, alcohol, and unsaturated hydrocarbons mixed with the ether with hydrogen in contact with a nickel catalyst at a temperature of 85° to 150° C. and a pressure of 100 to 1000 lbs. per square inch, and distilling the hydrogenated mixture to separate ether and closely associated boiling point saturated hydrocarbons from other hydrogenated products.

BERNARD J. C. van der HOEVEN.

REFERENCES CITED

The following references are of record in the file of this patent:

UNITED STATES PATENTS

| Number | Name | Date |
|---|---|---|
| Re. 11,740 | Fritzsche | May 9, 1899 |
| 1,185,704 | Ney | June 6, 1916 |
| 1,502,149 | Mann | July 22, 1924 |
| 1,601,404 | Mann et al. | Sept. 28, 1926 |
| 1,895,515 | Lazier | Jan. 31, 1933 |
| 1,899,961 | Henke | Mar. 7, 1933 |

OTHER REFERENCES

Ellis Hydrogenation of Organic Substance, page 189 (1930).